June 25, 1968 H. DIGGELMANN ET AL 3,390,235

SUBSCRIBER CIRCUITS FOR TELECOMMUNICATION SYSTEMS

Filed Jan. 21, 1965

Inventors
HANS DIGGELMANN
KARL SIUDA

BY Rupert J. Brady
ATTORNEY

United States Patent Office 3,390,235
Patented June 25, 1968

3,390,235
SUBSCRIBER CIRCUITS FOR TELECOMMUNICATION SYSTEMS

Hans Diggelmann, Muri, Bern, and Karl Siuda, Bern, Switzerland, assignors to Hasler, A.G., Bern, Switzerland, a Swiss company Filed Jan. 21, 1965, Ser. No. 426,906
Claims priority, application Switzerland, Jan. 20, 1964, 562/64
2 Claims. (Cl. 179—18)

The invention relates to a subscriber circuit for telecommunication systems, particularly telephone exchanges, for utilising to the full loop current flowing in a closed loop. The expression "subscriber circuit" is to be construed as meaning each of those circuits which is available in the exchange for each subscriber line or loop and connects the latter with the selector switches of the exchange.

The present circuit has two branches which are connected parallel to one another between the two conductors of the subscriber loop. The first branch includes the primary winding of the line transformer in series with a capacitor, and the second branch includes the central battery in series with a resistance and one input winding of a ring core. This ring core is magnetically saturated by the effect of the loop current and carries further windings which serve for ascertaining the magnetic saturation of the core ring for the purpose of fully utilising the loop current.

To attain symmetry it is usual for the primary winding of the line transformer to be divided into two symmetrical halves between which the capacitor is connected. The input winding and the resistance are similarly divided into two symmetrically arranged halves.

The manner in which the magnetic saturation of the core ring is ascertained is immaterial as far as the invention is concerned. The core ring may have, in addition to the input winding, which may be a premagnetizing winding, a test winding and an output-pulse winding. In this event, the core ring is magnetically saturated in one direction in the rest condition by the continuously-flowing current in the premagnetization winding, and it is saturated in the opposite direction when the loop current flows additionally in the input winding. Test pulses in the test winding, whose pulse frequency is higher than the frequency of the signals in the loop, have effect in the opposite magnetic direction like the loop current and thereby occasion demagnetization of the core ring only when loop current flows. However the test pulses cannot change the magnetization of the ring core to any great extent when no loop current flows. In the output-pulse winding therefore, any pulses worth mentioning are induced when loop current flows.

From the determination of whether loop current does or does not flow there are derived switching operations, for example, for the choice of subscriber.

In a hitherto proposed circuit of this kind, the resistance serves to keep, at a low value, the attenuation which is effected by the second branch as a shunt in the first branch, and to limit the power component, useless flowing to the input winding, of the load to be transmitted from subscriber to subscriber. This resistance, however, also restricts the loop current flowing through the input winding, which gives rise to the switching operations, for example, for subscriber selection. Only a compromise solution is available for the rating of the capacitor as the latter should be as large as possible for the transmission, for example, of the speak alternating-current load from subscriber to subscriber. This capacitor, however, distorts the loop current pulses increasingly as it gets larger. Moreover, the first branch as a shunt to the second effects an undesirable attenuation of the latter.

In another hitherto proposed circuit, the second branch is not in parallel with the first branch but is connected in parallel with the capacitor of the latter and, instead of the resistance, contains a choke which has two symmetrically-arranged halves. In this circuit the aforementioned compromise likewise applies for the rating of the capacitor, the distortion of the loop current pulses through the capacitor being still more considerable. Moreover, in this circuit the first branch limits the current in the second branch, and the loop current effects a premagnetization of the line transformer.

An object of the invention is to obviate or mitigate the aforementioned disadvantages and to provide a subscriber circuit in which the signals are supplied practically completely to the input winding and the alternating current to be transmitted from subscriber to subscriber is supplied practically completely to the line transformer, and the dimensioning of which is not restricted to a compromise solution, i.e. the capacitor will not give rise to any unwanted distortion of the signals of the loop current transmitted to the input winding even on optimum dimensioning of the capacitor for the frequency band for transmitting from subscriber to subscriber.

The present invention is a subscriber circuit for telecommunications systems utilising to the full the loop current flowing in a closed loop, with two branches connected parallel to one another between the two conductors of the subscriber loop, the first branch including the primary winding of the line transformer in series with a capacitor and the second branch whereof contains the central battery in series with a resistance and an input winding of a ring core which is magnetically saturated by the effect of the loop current and carries further windings which serve to ascertain the magnetic saturation of the ring core for the purpose of utilising to the full the current flowing in the closed loop, and the second branch including two self-induction coils each connected to a conductor of the subscriber line, the ends of the coils remote from the conductors being connected by a second capacitor, the so-formed frequency-sensitive circuit having a high-pass filter formed by the primary inductance of the line transformer and the first-mentioned capacitor and a low-pass filter formed by the self-induction coils and the second capacitor and being completed by a resistance, the elements of said circuit being so dimensioned that the attenuation between the subscriber line and the line transformer is constant in the frequency band of the information to be transmitted from subscriber to subscriber and increases with decreasing frequency at lower frequencies the attenuation between the subscriber line and the input winding is constant from zero frequency to a frequency lying below the said frequency band and increases above this frequency with increasing frequency, and the input impedance of the frequency-sensitive circuit measured between the conductors remains constant from zero frequency to the upper limit of the aforesaid frequency band.

In accordance with the invtntion therefore, the frequency of the signals and the frequency band required for their adequately undistorted transmission is below the frequency band for transmitting from subscriber to subscriber. Proceeding therefrom the present invention provides for augmenting the subscriber circuit to a frequency-sensitive circuit. The elements of such a circuit can be so dimensioned according to any suitable evaluation process that practically the whole alternating-current load to be transmitted from subscriber to subscriber gets to the line transformer and practically the whole load of the signals of the loop current gets to the input winding, in which case the signals are also not distorted.

An embodiment of the invention will now be described, by way of example only with reference to the accompanying drawing, illustrating a subscriber circuit, in which.

Figure 1:
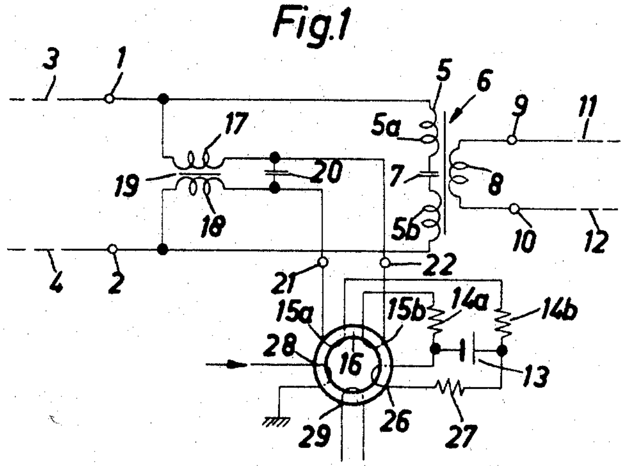
FIG. 1 shows a symmetrical subscriber circuit for a telephone system.

The subscriber circuit in accordance with FIG. 1 has two input terminals 1 and 2, each of which is connected to the two conductors 3 and 4 of the subscriber line. A first and a second branch are connected in parallel with each other between the input terminals 1 and 2. The first branch contains the primary winding 5 of the line transformer 6 in series with a capacitor 7. For the purposes of symmetry, the primary winding 5 is divided into two symmetrical halves 5*a* and 5*b*, between which the capacitor 7 is connected. The secondary winding 8 of the line transformer 6 is connected to a pair of terminals 9 and 10 which is connected through a twin conductor 11 and 12 with the selector switches of the telephone exchange, which is not shown. The second branch contains the central battery 13, a resistance divided into two symmetrically-arranged halves 14*a* and 14*b*, and an input winding divided into two symmetrically-arranged halves 15*a* and 15*b* of a ring core 16, which has a pronounced saturatin characteristic, and two symmetrical self-induction coils 17 and 18, which are wound on a core 19 common thereto. These self-induction coils 17 and 18 are connected each at one end with one of the input terminals 1 and 2. The ends of the self-induction coils 17 and 18 remote from the terminals 1 and 2 are connected together by a capacitor 20 and are in connection with a second pair of output terminals 21 and 22.

Figure 2:
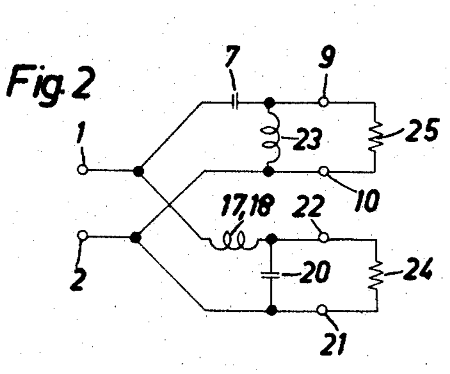
FIG. 2 shows a symmetrical equivalent diagram of a part of the circuit according to FIG. 1.

That part of the subscriber circuit shown in FIG. 1 which joins the three pairs of terminals 1 and 2, 9 and 10 and 21 and 22 with one another forms a frequency-sensitive circuit as will be seen in FIG. 2. In FIG. 2 the primary inductance of the line transformer 6 is denoted 23, the input winding 15*a*, 15*b* and the resistance 14*a*, 14*b* are combined in one resistance 24, and the frequency-sensitive circuit is shown unsymmetrically for the sake of simplicity. The frequency-sensitive circuit consists of a high-pass filter and a low-pass filter. The high-pass filter consists of the first-named capacitor 7 and the primary inductance 23 of the line transformer 6 and is completed by a resistance 25 which is the same as the value of the load resistance at the twin conductor 11 and 12 when multiplied by the square of the ratio of the line transformer 6. The low-pass filter consists of the self-induction coils 17 and 18 and the second capacitor 20 and is completed by a resistance 24.

Figure 3:
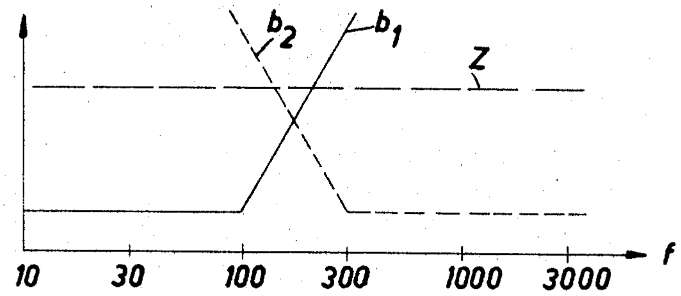
FIG. 3 shows a schematic diagram of the frequency dependance of the attenuations and the input impedance of the circuits according to FIGS. 1 and 2.

This frequency-sensitive circuit is so evaluated in accordance with the known formulae for evaluatnig such networks, that the following conditions are fulfilled: the attenuation $b_1$ between the terminals 1 and 2 and 21 and 22 is constant from the zero frequency (direct current) up to a frequency below the speech frequency band, and increases above this frequency with increasing frequency, the attenuation $b_2$ between the terminals 1 and 2 and 9 and 10 is constant in the speech frequency band and increases below this frequency band with diminishing frequency, and the impedance Z between the terminals 1 and 2 is constant from the lowest frequency included in the signals up to the upper limit of the speech frequency band to be transmitted (FIG. 3). Thus the resistance 24 as a circuit-completing resistance is equal to the output-side surge resistance of the low-pass filter 17, 18 and 20, and the ratio of the line transformer 6 is so selected that the value of the load resistance at the twin conductor 11 and 12 when multiplied by this ratio is equal to the output side surge resistance of the high-pass filter 7 and 23.

As a result of the manner of construction of the subscriber circuit as a frequency-sensitive circuit and its aforementioned dimensioning thereof, the signals of the loop current are practically completely transmitted at the terminals 21 and 22, and the speech alternating current is transmitted practically completely at the terminals 9 and 10.

The ring core 16 carries in addition to the input winding 15*a*, 15*b*, a premagnetization winding 26, which is fed from the central battery 13 through a resistance 27, a test winding 28, and an output pulse winding 29. The ring core with these windings has the aforementioned functions for ascertaining the loop current flowing in the closed loop. For the same purpose other heretofore proposed combinations of windings on the ring core can be used.

The subscriber circuit as described above, can be produced not only for a telephone exchange but also for any other telecommunications system. In this case, the speech frequency band is substituted by the frequency band for the other kind of information to be transmitted from subscriber to subscriber.

We claim:

1. A subscriber circuit for telecommunications systems utilising to the full the loop current flowing in a closed loop, with two branches connected parallel to one another between the two conductors of the subscriber loop, the first branch including the primary winding of the line transformer in series with a capacitor and the second branch whereof contains the central battery in series with a resistance and an input winding of a ring core which is magnetically saturated by the effect of the loop current and carries further windings which serve to ascertain the magnetic saturation of the ring core for the purpose of utilising to the full the current flowing in the closed loop and the second branch including two self-induction coils each connected to a conductor of the subscriber line, the ends of the coils remote from the conductors being connected by a second capacitor, the so-formed frequency-sensitive circuit having a high-pass filter formed by the primary inductance of the line transformer and the first-mentioned capacitor and a low-pass filter formed by the self-induction coils and the second capacitor and being completed by a resistance, the element of said circuit being so dimensioned that the attenuation between the subscriber line and the line transformer is constant in the frequency band of the information to be transmitted from subscriber to subscriber and increases with decreasing frequency at lower frequencies, the attenuation between the subscriber line and the input winding is constant from zero frequency to a frequency lying below the said frequency band and increases above this frequency with increasing frequency, and the input impedance of the frequency-sensitive circuit measured between the conductors remains constant from zero frequency to the upper limit of the aforesaid frequency band.

2. A subscriber circuit according to claim 1, in which the self-induction coils are arranged on a core common thereto.

No references cited.

KATHLEEN H. CLAFFY, *Primary Examiner.*

A. H. GESS, *Assistant Examiner.*